United States Patent [19]

Schmidt et al.

[11] Patent Number: 5,727,227
[45] Date of Patent: Mar. 10, 1998

[54] INTERRUPT COPROCESSOR CONFIGURED TO PROCESS INTERRUPTS IN A COMPUTER SYSTEM

[75] Inventors: Rodney W. Schmidt, Austin; Brian C. Barnes, Round Rock, both of Tex.

[73] Assignee: Advanced Micro Devices, Sunnyvale, Calif.

[21] Appl. No.: 559,659

[22] Filed: Nov. 20, 1995

[51] Int. Cl.[6] .................................................. G06F 1/00
[52] U.S. Cl. ...................... 395/800; 395/733; 364/228.6; 364/DIG. 1
[58] Field of Search ............................. 395/800, 733, 395/737; 364/228.6, DIG. 1

[56] References Cited

U.S. PATENT DOCUMENTS

| H1385 | 12/1994 | Stickel et al. | 395/800 |
|---|---|---|---|
| 5,155,839 | 10/1992 | Weppler | 395/500 |
| 5,193,189 | 3/1993 | Flood et al. | 395/673 |
| 5,603,035 | 2/1997 | Erramoun et al. | 395/733 |

OTHER PUBLICATIONS

Intel Corp., "MultiProcessor Specification", Version 1.1 Apr., 1994, pp. 1.1–Glossary 2.
Hummel, "PC Magazine Programmer's Technical Reference: The Processor and Coprocessor", 1992, pp. 153–182.
Intel Corp., "Microprocessor & Peripheral Handbook–vol. I Microprocessor", 1989 pp. 2–259 through 2–277.
Singh et al., "16–Bit and 32–Bit Microprocessors Architecture, Software, and Interfacing Techniques", 1991, pp. 302–305.

Primary Examiner—John E. Harrity
Attorney, Agent, or Firm—Conley, Rose & Tayon; B. Noel Kivlin

[57] ABSTRACT

A computer system employing an interrupt coprocessor is provided. The interrupt coprocessor is signaled by an interrupt controller to service a particular interrupt request. The interrupt coprocessor may include limited functionality, such that if a particular interrupt request is beyond the capabilities of the interrupt coprocessor, the microprocessor is interrupted. Context saves may be avoided in the interrupt coprocessor. Interrupt latency is reduced, as well as interruption of one or more main microprocessors in the computer system. Several embodiments are shown with a range of interrupt servicing capabilities. A data pump is shown, which is configured to transfer data from a source to a destination. A microcontroller is shown, which may manipulate the data as it is moved from source to destination or access the interrupting device to determine the service needed. Finally, a microprocessor similar to the main microprocessors of the computer system is shown. The microprocessor is capable of accessing system resources in a similar fashion to the main microprocessor, and therefore is capable of performing all interrupt servicing functions.

27 Claims, 4 Drawing Sheets

INTERRUPT COPROCESSOR CONFIGURED TO PROCESS INTERRUPTS IN A COMPUTER SYSTEM

BACKGROUND OF THE INVENTION

1. Field of the Invention

This invention is related to the field of computer systems and, more particularly, to interrupt servicing mechanisms within computer systems.

2. Description of the Relevant Art

Modern computer systems and the software which runs thereon demand a high performance interrupt structure in order to operate efficiently. Interrupts are used to switch between tasks, and so a multi-tasking operating system benefits from a high performance interrupt structure. A "multi-tasking" operating system is configured to run multiple programs concurrently. Additionally, interrupts provide a means for an electronic device external to the microprocessor to request attention from the operating system. Modern day computer systems are including increasing numbers of these electronic devices, prompting the need for a high performance interrupt structure.

Interrupts cause a microprocessor within the computer system to suspend execution of a task in order to execute a specific software routine (referred to as an interrupt service routine) comprising a set of instructions. The interrupt is typically unrelated to the instructions being executed by the microprocessor at the time the interrupt is signaled. Instead, the interrupt is caused by an external device requiring software attention. For example, a buffer within an input/output device may fill with data to be transferred to another device or to memory. Many other sources for interrupts are well-known to the skilled artisan.

The instructions being executed by the microprocessor at the time the interrupt occurs are referred to herein as a "task". A task may be a portion of a program, an operating system routine, or even another interrupt service routine.

Because the interrupt is normally unrelated to the task being performed by the microprocessor and is asynchronous to the task itself, the interrupt service routine is executed in such a way that the task may be resumed. In order to resume the task, the "context" within which the task is executing is saved to memory. The context includes register values associated with the task when the task is interrupted. Additionally, the context may include the values within any memory locations that may be accessible to the task. The register portion of the context is saved to memory, and the memory locations are saved by causing the current values stored therein to be visible to the computer system. For example, memory locations are saved if stored into a data cache and the data cache is maintained coherent with main memory. After saving the context, the interrupt service routine is executed. Upon completion of the interrupt service routine, the context is restored to the microprocessor and the task is resumed. Since the restored context is identical to the context when the task was interrupted, the task executes normally. In other words, the interrupt had no affect on the result of executing the task if the task is unrelated to the interrupt. Instead, only the time required to execute the task is affected.

The x86 architecture defines the context of 32 bit microprocessors to be 68 bytes. Additionally, when the segment registers (which are part of the context in the x86 architecture) are reloaded, segment reloads are initiated to translate the segments. More bytes are transferred when the reload occurs, and clock cycles are required to translate the extra bytes into a format for storing within the microprocessor.

Unfortunately, storing and retrieving a large number of bytes to memory (as a context save entails) often requires a relatively large number of clock cycles. A clock cycle refers to the amount of time required by portions of the microprocessor to perform their functions. At the end of the clock cycle, the results of each function are stored in a storage location (e.g. a register or memory) and may be used by another function in the next clock cycle. The bus used by a microprocessor to communicate with other electrical devices may operate according to a different clock cycle than the microprocessor itself. The clock cycle associated with the bus is often referred to as the bus clock cycle.

If the context is saved by the microprocessor when an interrupt is recognized by the microprocessor, the interrupt is being handled via a "task switch". The interrupt service routine is isolated from the interrupted task such that any modifications the interrupt service routine performs to the microprocessor's context information will not affect the operation of the task when resumed. The context is restored prior to resuming the task. Often, an interrupt service routine will only require access to a few registers within the register set to perform its function. In this case, a full context save is not necessary since some registers will not be modified by the interrupt service routine. Instead, only those storage locations which must be changed in order to fetch the instructions within the interrupt service routine need be saved prior to beginning execution of the interrupt service routine. For example, in the x86 architecture the EIP register and CS segment register (which define the address and segment of the instructions to be fetched and executed) and the flags register (which is modified by many of the x86 instructions) are saved. These values are pushed onto the stack defined by the x86 architecture when not using the task switch method of interrupt handling.

When the task switch method of interrupt handling is not in use, an interrupt service routine must save the values stored within registers which it employs to carry out its intended function. Often, the values are stored on the stack. This method of interrupt handling is referred to as an interrupt gate or trap gate in the x86 architecture, depending on whether or not the interrupt service routine may itself be interrupted. If the interrupt service routine does not use all of the microprocessor's context, then clock cycles may be saved with respect to performing the full context save of a task switch. The interrupt service routine is entered and exited more rapidly since context save and restore is not performed. Unfortunately, at least a few registers must still be stored. Additionally, the interrupt service routines are lengthened by the number of instructions required to save and restore context values used by the interrupt service routines. Furthermore, an administrative burden is placed on the programmer of the interrupt service routine to update the save and restore portions of the routine when the routine is changed.

Since there are multiple sources of interrupts, the computer system provides a mechanism for identifying one of multiple interrupt service routines. The computer system thus provides flexibility to the programmer in that an interrupt service routine may be tailored to the needs of a particular device or interrupt source. Without such flexibility, all interrupts would fetch an interrupt service routine from the same address in memory. A relatively complicated routine stored at the address would need to be written to perform the handling of all types of interrupts from all electronic devices. As used herein, the term "fetching" refers to transferring the contents of a memory location to a destination.

One method for providing the address of the interrupt service routine for a given interrupt is for the microprocessor to request an interrupt vector from another electronic device in the system. An "interrupt vector" is a number which is indicative of a particular interrupt service routine. In the x86 microprocessor, for example, the interrupt vector is an index into an interrupt vector table which provides information identifying the address of the associated interrupt service routine. The interrupt vector table is also referred to as an interrupt descriptor table.

In many computer systems, the interrupt vector is provided via a dedicated bus transaction. A "bus transaction" is a transfer of information across a bus. Bus transactions may include address and data information as well as the type of transfer. Bus transactions may be address-only, in which an address and related control information are broadcast; data-only, in which data and related control information are broadcast; or address-data in which both address and data are involved. As referred to herein, a bus transaction dedicated for interrupt processing is an interrupt acknowledge bus transaction. Typically, an interrupt acknowledge bus transaction is performed by the microprocessor to acknowledge the existence of an interrupt condition and then a second interrupt acknowledge bus transaction is performed to collect the interrupt vector. Unfortunately, many clock cycles are used to perform the two interrupt acknowledge bus transactions. Until the interrupt vector is known, the computer system may not begin fetching the interrupt service routine.

Current interrupt structures (as described above) require a large number of clock cycles to execute. Clock cycles are used to save and restore a tasks context (either within the interrupt routine or prior to fetching it), to fetch the interrupt vector, and to execute the interrupt service routine. The execution time of the interrupted task is lengthened considerably, deleteriously affecting performance. A method for servicing interrupts in a computer system without deleteriously affecting performance of the interrupted task is desired.

SUMMARY OF THE INVENTION

The problems outlined above are in large part solved by a computer system employing an interrupt coprocessor according to the present invention. The interrupt coprocessor is signaled by an interrupt controller within the computer system to service a particular interrupt request. The interrupt coprocessor may include limited functionality, such that if a particular interrupt request is beyond the capabilities of the interrupt coprocessor, the microprocessor is interrupted. Advantageously, context saves may be avoided in the interrupt coprocessor. Interrupt latency is reduced, since the interrupt service routine is entered by the interrupt coprocessor upon signaling of the interrupt and transfer of the interrupt vector. The interrupt coprocessor generally does not perform other processing duties, and so no task is interrupted. Context saves are only performed if another interrupt service routine is interrupted. Additionally, performance of interrupt service routines by the interrupt coprocessor reduces interruption of one or more main microprocessors in the computer system. Therefore, performance of the computer system is enhanced by the increased availability of the main microprocessors to tasks.

Several embodiments are shown with a wide range of interrupt servicing capabilities. A data pump is shown, which is configured to transfer data from a source to a destination. A microcontroller is shown, which may perform more advanced interrupt servicing including manipulation of data as it is moved from source to destination. Additionally, the microcontroller may access the interrupting device to determine the service needed. Finally, a microprocessor similar to the main microprocessors of the computer system is shown. The microprocessor is capable of accessing system resources in a similar fashion to the main microprocessor, and therefore is advantageously capable of performing all interrupt servicing functions. Furthermore, the microprocessor is capable of performing other operations when not performing interrupt service routines. Each of the embodiments are appropriate for varying levels of cost and performance of the resulting computer system.

Broadly speaking, the present invention contemplates a computer system, comprising a microprocessor, an interrupt controller, and a dedicated interrupt coprocessor. The interrupt coprocessor is coupled between the interrupt controller and the microprocessor. The microprocessor is configured to execute a task and is configured to interrupt the task according to a signal upon an interrupt conductor. The interrupt controller is configured to receive a plurality of interrupt request signals and to convey an interrupt signal upon receipt of one of the plurality of interrupt request signals. The interrupt coprocessor is configured to execute interrupt service routines in response to the interrupt signal from the interrupt controller. Additionally, the interrupt coprocessor is coupled to the interrupt conductor and is configured to convey a signal upon the interrupt conductor. The interrupt coprocessor conveys the signal if it determines that the microprocessor is configured to execute the interrupt service routine.

The present invention further contemplates an interrupt coprocessor configured to receive an interrupt signal from an interrupt controller and to execute an interrupt service routine in response to the interrupt signal. The interrupt coprocessor comprises a bus interface unit and an execution unit coupled thereto. The bus interface unit is coupled to a bus and to an interrupt conductor, and is configured to receive the interrupt signal upon the bus. Furthermore, the bus interface unit is configured to cause the execution unit to execute the interrupt service routine in response to the interrupt signal. The execution unit, configured to execute instructions comprising an interrupt service routine, is further configured to execute an interrupt instruction. The bus interface unit is configured to convey a signal upon the interrupt conductor during a clock cycle in which the execution unit executes the interrupt instruction.

BRIEF DESCRIPTION OF THE DRAWINGS

Other objects and advantages of the invention will become apparent upon reading the following detailed description and upon reference to the accompanying drawings in which.

Figure 1:
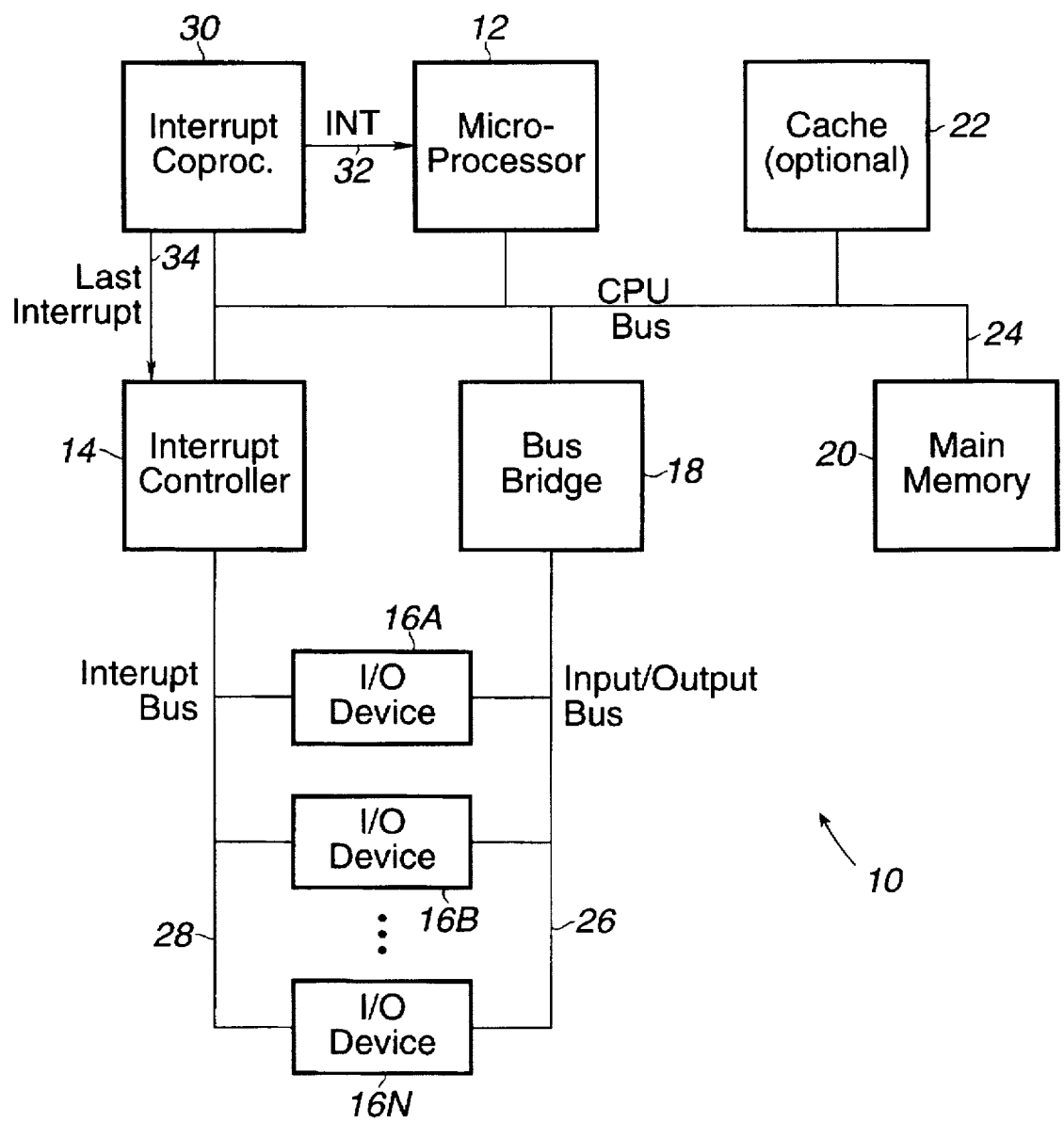
FIG. 1 is a block diagram of a computer system according to the present invention, including an interrupt coprocessor.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

Turning now to FIG. 1, a computer system 10 including a microprocessor 12, an interrupt controller 14, a plurality of input/output (I/O) devices 16A-16N (referred to collectively as I/O devices 16), a bus bridge 18, a main memory 20, a cache 22, and an interrupt coprocessor 30 is shown. Microprocessor 12, interrupt controller 14, bus bridge 18, main memory 20, cache 22, and an interrupt coprocessor 30 are coupled to a CPU bus 24 which effects high speed, high bandwidth communication between the connected devices. Lower speed, lower bandwidth communication is provided for I/O devices 16 via input/output bus 26. I/O devices 16 are coupled to interrupt controller 14 via an interrupt bus 28.

Interrupt coprocessor 30 is configured to perform certain interrupt service routines. Several embodiments of interrupt coprocessor 30 are given below, and the interrupt service routines each embodiment is configured to perform are detailed. Performance of computer system 10 is enhanced to the degree that interrupt coprocessor 30 is capable of performing interrupt service routines instead of interrupting microprocessor 12. It is noted that interrupt coprocessor 30 is configured to determine if it is capable of performing a particular interrupt service routine. In cases where interrupt coprocessor 30 determines that it cannot perform the requested interrupt service routine, interrupt coprocessor 30 asserts an interrupt signal upon an interrupt conductor 32 coupled to microprocessor 12. Microprocessor 12 may include interrupt handling hardware similar to that described above, and so the interrupt is serviced. It is noted that interrupt coprocessor 30 and microprocessor 12 may share processing of a particular interrupt, such that interrupt coprocessor 30 performs a portion of the interrupt service and microprocessor 12 performs the remaining portions.

When interrupt coprocessor 30 interrupts microprocessor 12 in order to service an interrupt, interrupt controller 14 will receive a second set of interrupt acknowledge bus transactions performed for a particular interrupt. Interrupt coprocessor 30 performs the first set of interrupt acknowledge bus transactions to fetch the interrupt vector and determine that it cannot completely service the interrupt. Interrupt coprocessor 30 asserts a last interrupt signal upon a conductor 34 to interrupt controller 14 during the second set of interrupt acknowledge bus transactions indicative that the bus transactions being performed are associated with the last interrupt vector provided. Interrupt controller 14, upon receipt of the last interrupt signal, provides the interrupt vector provided with the most previous set of interrupt acknowledge bus transactions.

In another embodiment, interrupt coprocessor 30 provides the interrupt vector to microprocessor 12 during the interrupt acknowledge bus transaction. In this embodiment, the last interrupt signal causes interrupt controller 14 to ignore the interrupt acknowledge bus transactions performed by microprocessor 12.

Interrupt bus 28 includes at least one interrupt conductor per I/O device 16A-16N. An interrupt request signal conveyed on the associated interrupt conductor is indicative of a request for interrupt of interrupt coprocessor 30 or microprocessor 12 by the associated I/O device 16A-16N. Interrupt controller 14 is configured to receive the interrupt request signals and to convey an interrupt signal to interrupt coprocessor 30 upon CPU bus 24 in response to the interrupt request signals. In one embodiment, interrupt controller 14 is similar to an 8259A interrupt controller used in IBM compatible personal computer systems. In another embodiment, interrupt controller 14 includes multiple interrupt controllers similar to the 8259A cascaded to allow a larger number of I/O devices 16 to be connected. Interrupt controller 14 is programmable, and may be enabled to assert the interrupt signal individually for each interrupt request signal. In other words, interrupt controller 14 may be enabled to assert the interrupt signal if the interrupt request signal from I/O device 16A is asserted but not if the interrupt request signal from I/O device 16B is asserted (or vice-versa). In another embodiment, interrupt controller 14 may be programmed with a priority scheme for the interrupt request signals. The priority scheme is devised such that, if multiple interrupt request lines are asserted concurrently; the highest priority interrupt request is serviced first; followed by the next highest priority interrupt request; etc.

Interrupt controller 14 provides the interrupt vector which identifies the location of the interrupt service routine associated with the interrupting I/O device 16A-16N. The interrupt vector is transferred across CPU bus 24 after microprocessor 12 or interrupt coprocessor 30 acknowledges receipt of the interrupt signal. In one embodiment, microprocessor 12 or interrupt coprocessor 30 issues an interrupt acknowledge bus transaction on CPU bus 24 when acknowledging the interrupt signal, and then issues a second interrupt acknowledge bus transaction to collect the interrupt vector. Other transactions upon CPU bus 24 are used to transfer data among devices coupled to CPU bus 24. An exemplary bus implementing such an interrupt acknowledge transaction may be found within the publication entitled: "16-bit and 32-bit Microprocessors Architecture, Software and Interfacing Techniques" by Singh, et al, Prentice Hall, Englewood Cliffs, N.J., 1991. This publication is incorporated herein by reference in its entirety.

Bus bridge 18 is provided to assist in communications (other than interrupt requests) between I/O devices 16 and devices coupled to CPU bus 24. I/O devices 16 typically require longer bus clock cycles than microprocessor 12 and other devices coupled to CPU bus 24. Therefore, bus bridge 18 provides a buffer between CPU bus 24 and input/output bus 26. Additionally, bus bridge 18 translates transactions from one bus protocol to another. In one embodiment, input/output bus 26 is an Enhanced Industry Standard Architecture (EISA) bus and bus bridge 18 translates from the CPU bus protocol to the EISA bus protocol. In another embodiment, input/output bus 26 is a Peripheral Component Interconnect (PCI) bus and bus bridge 18 translates from the CPU bus protocol to the PCI bus protocol. It is noted that many variations of CPU bus protocols exist. Microprocessor 12 may employ any suitable bus protocol.

I/O devices 16 provide an interface between computer system 10 and other devices external to the computer system. Exemplary I/O devices include a modem, a serial or parallel port, a sound card, etc. I/O devices 16 may also be referred to as peripheral devices. Main memory 20 stores data and instructions for use by microprocessor 12. In one embodiment, main memory 20 includes at least one Dynamic Random Access Memory (DRAM) cell and a DRAM memory controller. Cache 22 is a small, high speed memory for temporarily storing data and instructions from main memory 20. If microprocessor 12 requests an address from main memory 20 and cache 22 is storing data associated with the requested address, then cache 22 provides the data. Cache 22 is an optional component, computer system 10 is fully functional without it. However, cache 22 may improve the performance of computer system 10. It is noted that cache 22 may also be inserted between microprocessor 12 and CPU bus 24 in other embodiments.

Microprocessor 12 is a high performance microprocessor configured to execute instructions stored in main memory 20. In one embodiment, microprocessor 12 implements the x86 microprocessor architecture. It is noted that any microprocessor may be employed as microprocessor 12.

A second embodiment of computer system 10 is contemplated in which I/O devices 16 are coupled to CPU bus 24. Interrupt controller 14 and bus bridge 18 are not included in this embodiment. Instead, each I/O device 16 individually responds to interrupt acknowledge bus transactions in a manner similar to interrupt controller 14. It is noted that although computer system 10 as shown in FIG. 1 includes one microprocessor, other embodiments of computer system 10 may included multiple microprocessors similar to microprocessor 12. It is further noted that the above discussion refers to the assertion of various signals. As used herein, a signal is "asserted" if it conveys a value indicative of a particular piece of information. Conversely, a signal is "deasserted" if it conveys a value indicative of a lack of a particular piece of information. A signal may be defined to be asserted when it conveys a logical zero value or, conversely, when it conveys a logical one value. It is still further noted that devices attached to CPU bus 24 may also convey interrupt request signals to interrupt controller 14.

It is further noted that, although FIG. 1 shows interrupt controller 14 coupled to CPU bus 24, interrupt controller 14 may in fact be coupled to I/O bus 26 or another I/O bus. When interrupt controller 14 is configured in this manner, interrupt acknowledge bus transactions are conveyed to the interrupt controller through one or more bus bridges similar to bus bridge 18. Often, when interrupt controller 14 is not coupled to CPU bus 24 to receive bus transactions, interrupt controller 14 is still coupled directly to an interrupt conductor within CPU bus 24 in order to convey the aforementioned interrupt signal. Interrupt coprocessor 30 may be coupled to the same bus interrupt controller 14 is coupled to, in one embodiment. In another embodiment, interrupt coprocessor 30 may be integrated into interrupt controller 14.

Figure 2:
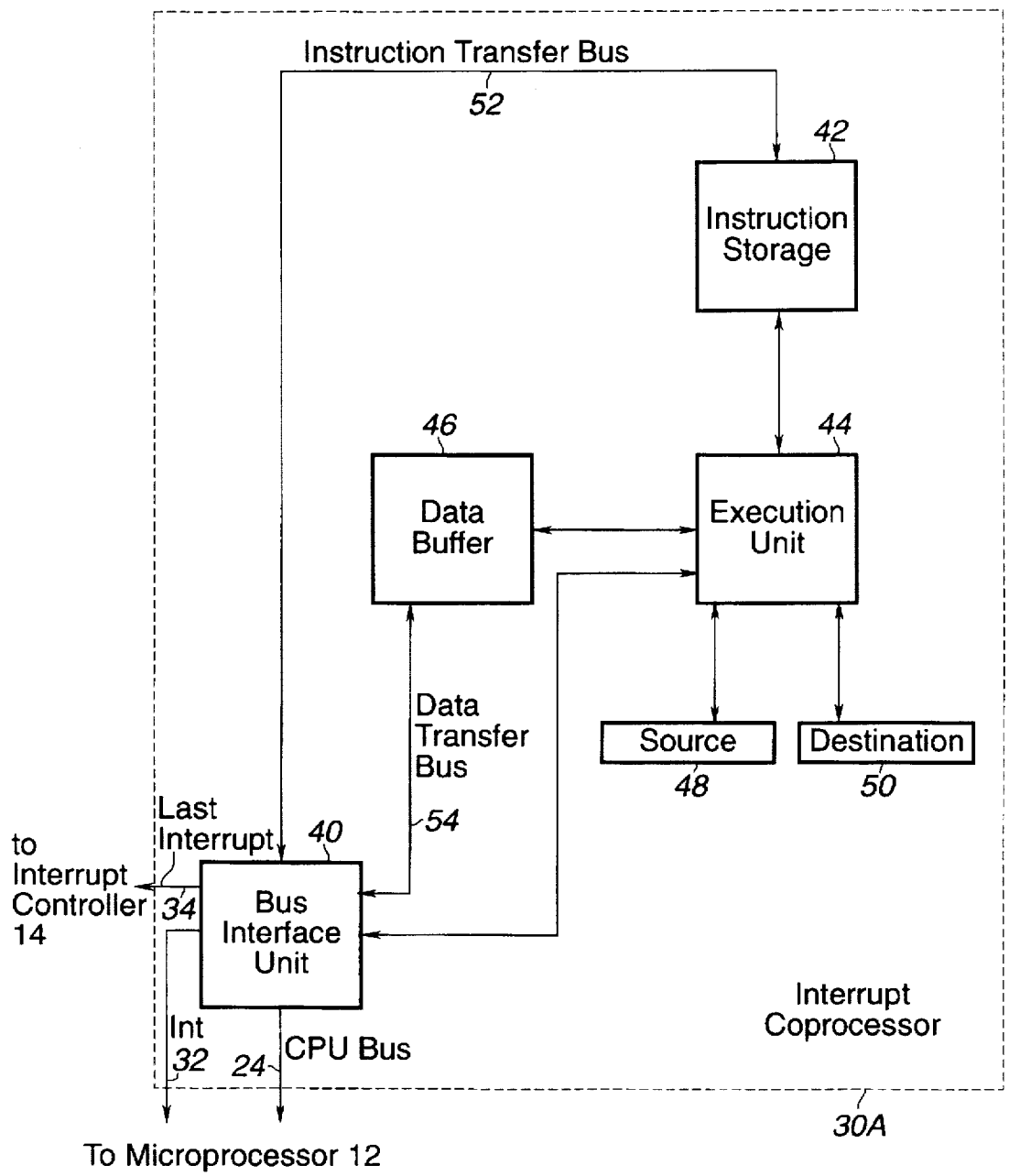
FIG. 2 is a block diagram of one embodiment of the interrupt coprocessor shown in FIG. 1.

Turning now to FIG. 2, a first embodiment of interrupt coprocessor 30 (interrupt coprocessor 30A) is shown. Interrupt coprocessor 30A includes a bus interface unit 40, an instruction storage 42, an execution unit 44, a data buffer 46, and source and destination registers 48 and 50. Bus interface unit 40 is coupled to CPU bus 24, interrupt conductor 32, and conductor 34. Additionally, bus interface unit is coupled to instruction storage 42 via an instruction transfer bus 52, to data buffer 46 via a data transfer bus 54, and to execution unit 44. Instruction storage 42, data buffer 46, and source and destination registers 48 and 50 are coupled to execution unit 44 as well.

Interrupt coprocessor 30A may be referred to as a "data pump". A data pump is a device which is configured to transfer data from a source to a destination. The data pump is not configured to modify the data during the transfer. Interrupt coprocessor 30A implements a rudimentary instruction set sufficient to perform the data movement. An exemplary instruction set for interrupt coprocessor 30A is shown in Table 1 below:

TABLE 1

Instruction Set for Interrupt Coprocessor 30A

| Instruction | Meaning |
|---|---|
| Load | Transfer a value from the address stored in source register 48 to data buffer 46. |
| Store | Transfer a value from data buffer 46 to the address stored in destination register 50. |
| Load Source | Load the source register with an immediate value or a value stored in the data buffer. |
| Load Dest. | Load the destination register with an immediate value or a value stored in the data buffer. |
| Inc Source | Increment the source register. |
| Inc Dest. | Increment the destination register. |
| Loop | Decrement a loop counter and branch to an instruction indicated by an immediate address if the loop counter is non-zero. |
| Load Loop Cnt | Load the loop counter register with an immediate value or a value from the data buffer. |
| Compare | Compare two values stored in the source register, the destination register, data buffer, or an immediate value. |
| Branch | Branch to an immediate address, based on the results of the compare instruction. |
| Interrupt | Interrupt microprocessor 12 for more advanced interrupt handling. |
| End | Interrupt service routine is complete. |

The Load and Store instructions are used to move data into and out of data buffer 46, according to the addresses stored in source register 48 and destination register 50, respectively. The number of bytes moved by the Load and Store instructions is determined by the size, in bytes, of data buffer 46. Combined with the Loop instruction, the Load and Store instructions may be performed repetitively to move a large amount of data. The Loop instruction causes the next instruction to be executed to be the instruction residing at an immediate address specified with the instruction. In one embodiment, the immediate address is a relative offset which is added to the address of the Loop instruction to determine the memory location storing the next instruction. The Loop instruction causes the next instruction to be executed to be the instruction subsequent to the Loop instruction if, after decrementing a loop counter within execution unit 44, the loop counter contains zero. The loop counter may be initialized to an immediate value or a value stored within data buffer 42 with the Load Loop Count instruction.

The Load Source and Load Destination instructions provide a means for initializing source and destination registers 48 and 50. The initialization may be an immediate value provided with the instruction, or the value may be the value stored in a location within data buffer 46. The immediate value method may be used if the addresses of the source and destination are fixed to a particular value within computer system 10. If the source or destination address is variable, then the address at which the source or destination address is stored may be loaded into source register 48, and then the Load instruction may be executed. The Load Source or Load Destination instruction may then be executed to cause the value stored within data buffer 46 to be copied into source register 48 or destination register 50.

Increment Source and Increment Destination ("increment") instructions are provided to allow for modification of the source and destination registers 48 and 50, respectively. The increment instructions cause either a positive or negative value to be added to source register 48 or destination register 50. The magnitude of the added value is indicative of the size of data buffer 46. For example, if data buffer 46 is configured to store 32 bytes of data, then the increment instructions increment by either positive or negative 32. The positive or negative increment is chosen by the programmer.

In order to allow more flexibility in programming interrupt service routines, the Compare and Branch instructions are provided. The Compare instruction compares two values from among the values stored in data buffer 46, source register 48, destination register 50, and an immediate value provided with the instruction. The result of the compare is a set of bits indicative of the first value being greater than the second value, the first value being less than the second value, and the first value being equal to the second value. The Branch instruction is configured to branch to an address indicated by an immediate value provided with the instruction if a selected one of the set of bits described above is set or clear. As with the Loop instruction, the immediate value provided with the Branch instruction is a relative offset which is added to the address of the Branch instruction to determine the target of the branch.

As noted above, interrupt coprocessor 30A is configured to interrupt microprocessor 12 if the interrupt service needed by the interrupting device is more complex than the interrupt coprocessor is configured to handle. Thus, interrupt coprocessor 30A includes an Interrupt instruction. The Interrupt instruction is inserted into an interrupt service routine at points in which the interrupt coprocessor has determined that the requested interrupt service is not a function that interrupt coprocessor 30A may perform. Interrupt coprocessor 30A interrupts microprocessor 12 upon execution of an Interrupt instruction. It is noted that interrupt coprocessor 30A may perform a portion of the interrupt service (such as data movement), and microprocessor 12 may perform the remaining portions of the interrupt service.

When the End instruction is executed, the interrupt service routine is complete. Interrupt coprocessor 30A ceases instruction execution until directed by bus interface unit 40 to execute another interrupt service routine.

It is noted that the above discussion often mentions several options for a particular instruction. These options are selected by the programmer of the interrupt service routine according to the programmer's needs. It is further noted that the above instruction set is an exemplary embodiment. Other embodiments of interrupt coprocessor 30A having more advanced instruction sets are contemplated. It is still further noted that the terms "immediate address" and "immediate value" refer to a set of bits encoded into the associated instruction or which immediately follow the associated instruction within instruction storage 42.

Execution unit 44 includes circuits configured to execute the instruction set described above. In particular, execution unit 44 is configured to control data buffer 46, source register 48, and destination register 50 according to the instruction set above. Additionally, execution unit 44 communicates with bus interface unit 40 in order to transfer data upon CPU bus 24. When execution unit 44 executes an End instruction, execution unit 44 asserts a signal to bus interface unit 40 indicative of the End instruction. Similarly, execution unit 44 asserts another signal to bus interface unit 40 indicative of execution of an Interrupt instruction.

Execution unit 44 receives the instructions it is intended to execute from an instruction storage 42. Instruction storage 42 includes a plurality of storage locations for storing instructions. Additionally, instruction storage 42 includes an address pointer register indicative of the storage location within the plurality of storage locations which stores the next instruction to be executed by execution unit 42. The address pointer register is incremented each clock cycle in which an instruction is provided to execution unit 44. Additionally, the address pointer register may be changed to another value by bus interface unit 40 during a clock cycle in which bus interface unit 40 receives an interrupt. Execution unit 44 may change the address pointer register value according to a Loop or Branch instruction, as described above.

In one embodiment, instruction storage 42 is an instruction cache configured to store instructions according to the addresses at which the instructions are stored within main memory 20. Bus interface unit 40 translates the interrupt vector provided by interrupt controller 14 through an interrupt vector mapping stored within bus interface unit 40. Additionally, instruction storage 42 is configured to determine if a particular address is stored within instruction storage 42 (i.e. the address "hits" in instruction storage 42). If an address misses instruction storage 42, then instruction storage 42 requests the associated instructions from bus interface unit 40 through instruction transfer bus 52. Bus interface unit 40 transfers the instructions from main memory 20 into instruction storage 42.

In another embodiment, instruction storage 42 is a storage device designed to store instructions according to interrupt vector. When bus interface unit 40 transfers a particular interrupt vector from interrupt controller 14, the interrupt vector is transferred to instruction storage 42. Instruction storage 42 executes the associated interrupt service routine. In this embodiment, instructions are transferred into instruction storage 42 from microprocessor 12 when computer system 10 is initially powered on. In yet another embodiment, instruction storage 42 is a Read-Only Memory (ROM) in which the instructions are permanently stored according to interrupt vector.

Data buffer 46 is a plurality of storage locations configured to store data bytes. Different embodiments of data buffer 46 may store different numbers of bytes. In one particular embodiment, data buffer 46 stores 32 bytes. Each storage location within data buffer 46 is individually addressable by the instruction set of interrupt coprocessor 30A.

Bus interface unit 40 is configured to effect communications between interrupt coprocessor 30A and other devices coupled thereto. Bus interface unit 40 is configured to convey and receive bus transactions, including interrupt acknowledge bus transactions. Bus transactions are conveyed according to requests from instruction storage 42 and execution unit 44. Additionally, bus interface unit 40 is configured to assert a signal upon interrupt conductor 32 upon receipt of a signal from execution unit 44 indicative of execution of the aforementioned interrupt instruction. Concurrently, bus interface unit 40 asserts a signal upon conductor 34 to interrupt controller 14 indicative that the set of interrupt acknowledge bus transactions that microprocessor 12 performs are associated with the last interrupt vector transferred. The signal upon conductor 34 remains asserted until microprocessor 12 has performed its interrupt acknowledge bus transactions.

Bus interface unit 40 is configured to store an in-service value indicating that interrupt coprocessor 30A is executing an interrupt service routine, as well as a nested value indicating that the currently executing interrupt service routine interrupted another interrupt service routine. The in-service value is set when bus interface unit 40 acknowledges an interrupt, and is cleared when either the Interrupt or the End instruction is executed by execution unit 44. If bus interface unit 40 receives a second interrupt signal while the in-service value is set, then the interrupt coprocessor 30 performs a context save. The nested value is saved as part of the context. When the Interrupt or End instruction is executed, then bus interface unit 40 examines the nested value. If the nested value is set, the context of the interrupted interrupt service routine is restored. If the nested value is clear, then the interrupt coprocessor idles until the next interrupt signal is received. It is noted that the interrupt service routines executed by interrupt coprocessor 30 are preferably coded as efficiently as possible, such that interrupt service routines are rarely interrupted.

In one embodiment, bus interface unit 40 is configured to translate interrupt vectors received as a result of an interrupt acknowledge bus transaction into an address of an interrupt service routine. Bus interface unit 40 includes an interrupt mapping table, transferred to bus interface unit 40 by microprocessor 12, which identifies an address in main memory 20 associated with each interrupt vector. A block of memory identified by the address associated with a particular interrupt vector stores instructions for interrupt coprocessor 30A. Such a transfer of information by microprocessor 12 to interrupt coprocessor 30 may be accomplished through a series of bus transactions between microprocessor 12 and interrupt coprocessor 30.

Figure 3:
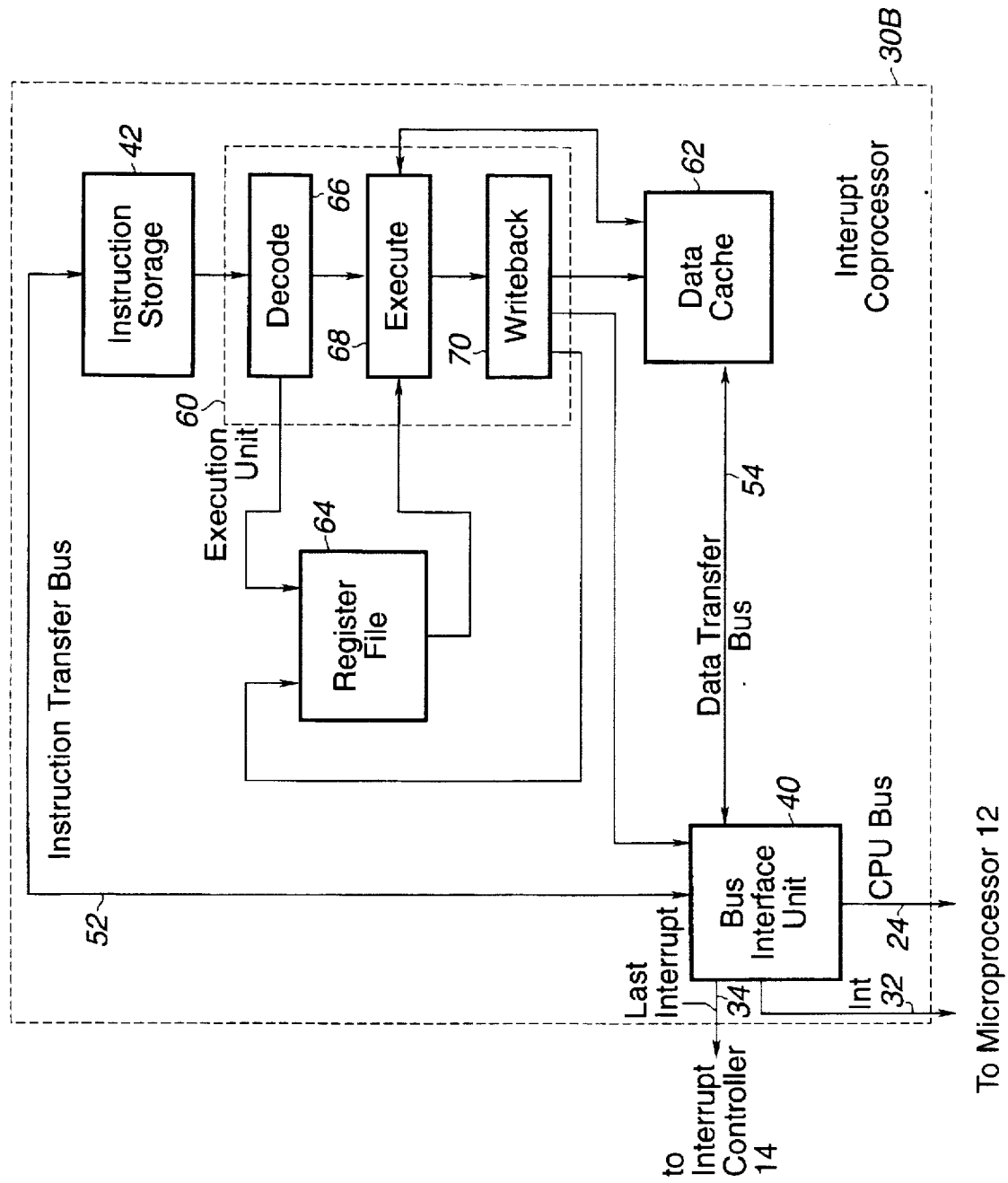
FIG. 3 is a block diagram of a second embodiment of the interrupt coprocessor shown in FIG. 1.

Turning now to FIG. 3, a second embodiment of interrupt coprocessor 30 (interrupt coprocessor 30B) is shown. Interrupt coprocessor 30B is referred to as a "microcontroller". As used herein, a microcontroller is a processing unit designed for use in embedded applications such as laser printers, telecommunications devices, networking devices, etc. Microcontrollers have much in common with microprocessors such as microprocessor 12. For example, modern microcontrollers often employ caches to speed memory access. However, microcontrollers are often designed with a lower cost objective than microprocessors. Additionally, microcontrollers typically interface more directly with peripheral devices (such as I/O devices 16) than microprocessors. Also, the instruction set of microcontrollers is typically more directed to the tasks embedded applications perform, as opposed to the more general instruction set of a microprocessor.

Interrupt coprocessor 30B includes a bus interface unit 40 and an instruction storage 42 similar to those described with respect to interrupt coprocessor 30A. Additionally, interrupt coprocessor 30B includes an execution unit 60, a data cache 62, and a register file 64. Execution unit 60 includes a decode stage 66, an execute state 68, and a writeback stage 70. In one embodiment, execution unit 60 is configured to execute instructions according to the Am29000 architecture developed by Advanced Micro Devices, Inc. of Sunnyvale, Calif. Other embodiments may be configured to execute instructions from other microcontroller architectures. In addition to the microcontroller instruction set, execution unit 60 is configured to execute the Interrupt and End instructions described above.

Decode stage 66 is coupled to receive instructions from instruction storage 42. The received instructions are decoded by decode stage 66. Register operands are determined and values indicative of the registers are conveyed to register file 64. Additionally, decode stage 66 bit-encodes the received instructions for execution by execute unit 68.

Execute stage 68 receives bit-encoded instructions from decode stage 66. The bit-encoded instructions indicate the desired operation. During the same clock cycle as the instruction is conveyed by decode stage 66, register operand values are conveyed from register file 64. Therefore, execute stage 68 may perform the indicated operation upon the indicated operand values. Exemplary operations are arithmetic operations such as addition and subtraction, as well as logical operations such as AND, OR, or bit shifting. Furthermore, branch instructions are executed by execute stage 68. Load and store instructions are executed by execute stage 68, and so execute stage 68 is coupled to data cache 62. Results produced via execution of the instruction in execute stage 68 are passed to writeback stage 70.

Writeback stage 70 stores the results produced by execution of an instruction in execute stage 68 into a destination identified by the instruction. In one embodiment, destinations are a register within register file 64. In other embodiments, destinations are within register file 64 or may also be a memory location. Therefore, writeback stage 70 is coupled to register file 64 and data cache 62.

Writeback stage 70 is configured to convey signals indicative of execution of Interrupt and End instructions to bus interface unit 40, similar to execution unit 44 described above. In this manner, bus interface unit 40 receives information enabling it to assert signals upon interrupt conductor 32 and conductor 34, similar to that described above.

It is noted that dependency checking is performed between writeback stage 70, execute stage 68, and decode stage 66 such that instructions which require the result of an instruction executed just prior to that instruction receive the correct operand values. If an instruction in decode stage 66 requires the result of an instruction in execute stage 68, for example, the result is forwarded to execute stage 68 in the following clock cycle from execute stage 68 instead of from register file 64.

In addition to data movement functions similar to interrupt coprocessor 30A, interrupt coprocessor 30B is configured to manipulate data being transferred from a source to a destination. Interrupt coprocessor 30B implements a register file 64 and a data cache 62 to facilitate data manipulation. Having multiple registers within register file 64 allows intermediate values to be calculated between source values and final destination values. Additionally, large blocks of data may be stored in data cache 62, allowing source data stored at dissimilar addresses to be combined to create destination data. Complex data manipulations may therefore be performed by interrupt coprocessor 30B.

Register file 64 includes a plurality of registers for storing data. Each register is identifiable as the source and/or destination of an instruction within the instruction set of interrupt coprocessor 30B. Register file 64 conveys values stored within registers identified by decode stage 66 to execute stage 68. Additionally, register file 64 stores values conveyed by writeback stage 70 into a particular register identified by writeback stage 70.

Data cache 62 is a relatively small, high speed memory configured to store data being manipulated by interrupt coprocessor 30B. It is noted that data cache 62 may be configured in a set-associative or direct-mapped configuration.

As noted above, interrupt coprocessor 30B is configured to interface with I/O devices 16. Therefore, interrupt coprocessor 30B may access I/O devices 16 and perform advanced interactions with the I/O devices. For example, interrupt coprocessor 30B may read status and control information from an I/O device in order to determine the service needed by that I/O device. In this manner, interrupt coprocessor 30B may perform advanced interrupt service routines.

Figure 4:
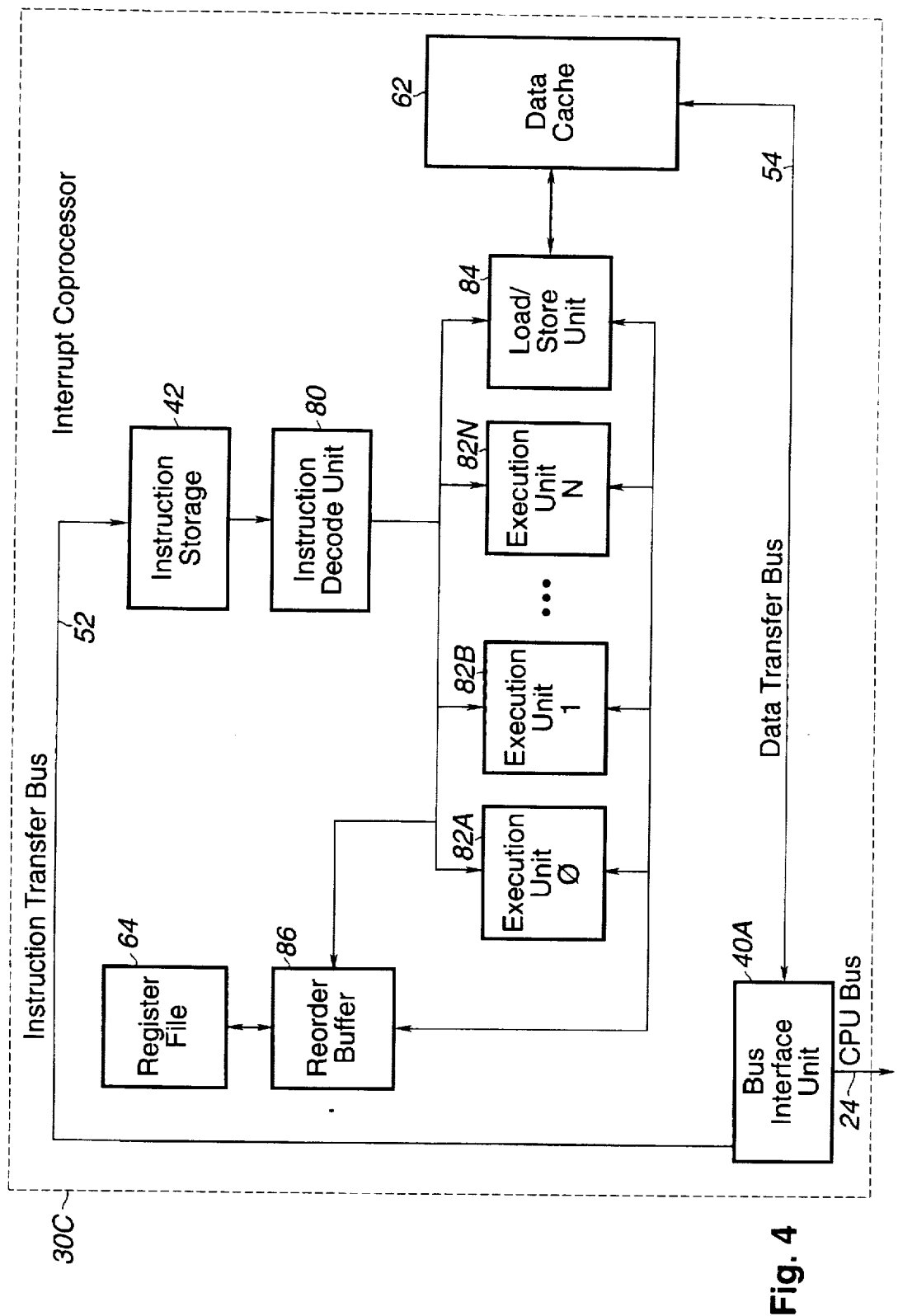
FIG. 4 is a block diagram of a third embodiment of the interrupt coprocessor shown in FIG. 1.

Turning now to FIG. 4, a third embodiment of interrupt coprocessor 30 (interrupt coprocessor 30C) is shown. Interrupt coprocessor 30C is a microprocessor similar to microprocessor 12. As such, interrupt coprocessor 30C includes a programming model compatible with microprocessor 12. The "programming model" of a microprocessor is the set of resources that a programmer interfacing with computer system 10 may utilize. The programming model includes the instruction set, the register set, the memory addressing modes implemented by the microprocessor, etc.

Interrupt coprocessor 30C may access the high level data structures created by the operating system running upon computer system 10, as well as any other devices which microprocessor 12 may access. Interrupt coprocessor 30C may perform any actions that microprocessor 12 may perform, and therefore does not employ interrupt conductor 32 or conductor 34. Instead, interrupt coprocessor 30C services all interrupt requests.

In addition, the interrupt service routines executed by microprocessor 12 may be executed by interrupt coprocessor 30C. A computer system similar to computer system 10 (shown in FIG. 1) may be constructed without interrupt coprocessor 30C. The computer system could later be upgraded to computer system 10 by installing an interrupt coprocessor. The operating system running upon computer system 10 would be informed of the presence of interrupt coprocessor 30C, but no other software changes would be required. Therefore, interrupt coprocessor 30C is a seamlessly upgradeable interrupt coprocessor.

Interrupt coprocessor 30C includes a bus interface unit 40A, instruction storage 42, data cache 62, and register file 64 similar to like numbered elements of FIG. 3. Bus interface unit 40A is similar to bus interface unit 40, except that it does not contain interrupt conductor 32 or conductor 34. Instruction transfer bus 52 couples instruction storage 42 to bus interface unit 40A, and data transfer bus 54 couples data cache 62 to data transfer bus 54. Interrupt coprocessor 30C further includes an instruction decode unit 80 coupled to instruction storage 42, a plurality of execution units 82A-82N (referred to collectively as execution units 82), a load/store unit 84, and a reorder buffer 86. Execution units 82 and load/store unit 84 are coupled to instruction decode unit 80 and to reorder buffer 86. Additionally, load/store unit 84 is coupled to data cache 62.

Interrupt coprocessor 30C is a superscalar microprocessor configured to execute multiple instructions during a clock cycle. Decode unit 80 therefore decodes multiple instructions during a single clock cycle and dispatches the instructions to execution units 82. Additionally, a storage location within reorder buffer 86 is allocated for each decoded and dispatched instruction. The storage locations are allocated to instructions in the order they occur within the task, so that the results created by executing the instructions may be recorded in register file 64 or data cache 62 in program order. By including reorder buffer 86, instructions may be speculatively executed out of order by execution units 82. In one embodiment, execution units 82 are asymmetrical execution units. Each execution unit 82A-82N is configured to execute a particular subset of interrupt coprocessor 30C's instruction set. The particular subset of the instruction set which execution unit 82A is configured to execute may differ from the particular subset of the instruction set which execution unit 82B is configured to execute. Similarly, other execution units may have differing particular subsets of the instruction set. In another embodiment, execution units 82 are symmetrical execution units. Each execution unit 82A-82N is configured to execute a similar subset of the instruction set.

Load/store unit 84 is configured to execute load and store (i.e. read and write) memory transactions to data cache 62 according to the task being executed by interrupt coprocessor 30C. Additionally, load/store unit 84 may be configured to detect memory dependencies between load and store instructions.

Reorder buffer 86 provides dependency checking and result forwarding such that each instruction receives the correct operand values prior to that instruction being executed. Reorder buffer 86 includes temporary storage for the result of each instruction until that instruction is retired. An instruction is retired by storing its result into register file 64 or data cache 62 (if needed) and deleting the instruction from reorder buffer 86. If an instruction decoded by decode unit 80 requires the result of an instruction which has not yet executed, then a tag indicative of which reorder buffer storage location will store that result is forwarded to the execution unit receiving the instruction in lieu of the operand value. The execution unit then monitors the results produced by the execution units for the provided tag. When the result is generated, the execution unit generating the result conveys the tag along with the result to reorder buffer 86. The execution unit awaiting the tag captures the result and stores it along with the instruction for later execution. Monitoring for the register tag and capturing the associated result is referred to as "result forwarding". It is noted that any suitable reorder buffer configuration may be employed by interrupt coprocessor 30C.

Execution units 82 and load/store unit 84 may employ reservation stations to store instructions dispatched to the unit. An instruction remains in the reservation station until all of its operands are available, and then is executed by the associated execution unit. It is noted that load/store unit 84 performs store memory accesses in program order. Reorder buffer 86 conveys a value to load/store unit 84 indicative of which store memory accesses may be performed. The store memory accesses are performed to data cache 62 or, in the case of a miss in data cache 62, to main memory 20 through bus interface unit 40A. It is noted that the above mentioned reservation stations may be configured outside of the associated execution unit.

It is noted that, when an interrupt is signaled to interrupt coprocessor 30C, results stored in reorder buffer 86 may be discarded. The instruction most recently retired defines the context to be returned to. It is further noted that instruction cache 30 may employ branch prediction to further increase the performance of microprocessor 12B. Instruction cache 30 may employ any branch prediction mechanism.

Additional information regarding microprocessors may be found within the commonly assigned, co-pending patent application entitled "High Performance Superscalar Microprocessor", Ser. No. 08/146,382, filed Oct. 29, 1993 by Witt, et al now abandoned and continued as Ser. No. 08/501,243, filed Jul. 10, 1995. Further information regarding microprocessors may be found within the commonly assigned, co-pending patent application entitled "Superscalar Microprocessor Including a High Performance Instruction Alignment Unit", Ser. No. 08/377843, filed Jan. 25, 1995 by Witt, et al. The disclosures of these patent applications are incorporated herein by reference in their entirety.

It is noted that although FIG. 4 shows a superscalar microprocessor used as interrupt coprocessor 30C, any microprocessor may be used. Microprocessor 12 and interrupt coprocessor 30C are compatible in terms of a similar programming model and CPU bus 24.

It is noted that the embodiment of computer system 10 described above shows a separate interrupt coprocessor 30.

However, interrupt coprocessor 30 may be advantageously integrated into microprocessor 12, interrupt controller 14, or bus bridge 18 to achieve cost savings. Such embodiments are contemplated.

In accordance with the above disclosure, several embodiments of an interrupt coprocessor configured into a computer system are described. The interrupt coprocessors are programmable, and the various embodiments encompass a wide range of functionality and performance. Each embodiment which does not implement a full microprocessor includes hardware to interrupt a main processor of the computer system for higher levels of interrupt service. Since the interrupt coprocessor is dedicated, no context save need occur before executing the interrupt. Therefore, interrupt latency is advantageously decreased. Additionally, performance may be enhanced due to the reduced interruption of tasks executing on the microprocessor(s) of the computer system.

Numerous variations and modifications will become apparent to those skilled in the art once the above disclosure is fully appreciated. It is intended that the following claims be interpreted to embrace all such variations and modifications.

What is claimed is:

1. A computer system, comprising:
   a microprocessor configured to execute a task comprising a plurality of instructions, and wherein said microprocessor includes an interrupt conductor, and wherein said microprocessor is configured to interrupt said task according to a signal upon said interrupt conductor;
   an interrupt controller configured to receive a plurality of interrupt request signals and to convey an interrupt signal upon receipt of one of said plurality of interrupt request signals; and
   a dedicated interrupt coprocessor coupled between said interrupt controller and said microprocessor, wherein said interrupt coprocessor is configured to execute interrupt service routines in response to said interrupt signal from said interrupt controller, and wherein said interrupt coprocessor comprises a microcontroller, and wherein said interrupt coprocessor is coupled to said interrupt conductor, and wherein said interrupt coprocessor is configured to convey said signal upon said interrupt conductor if said interrupt coprocessor determines that said microprocessor is configured to execute said interrupt service routine.

2. The computer system as recited in claim 1 further comprising a main memory coupled to said microprocessor, wherein said main memory is configured to store tasks and interrupt service routines.

3. The computer system as recited in claim 1 further comprising a plurality of input/output devices coupled to said interrupt controller, wherein each of said input/output devices is configured to convey one of said plurality of interrupt request signals.

4. The computer system as recited in claim 1 wherein said interrupt coprocessor is configured to select one of a plurality of interrupt service routines for execution according to said one of said plurality of interrupt request signals.

5. The computer system as recited in claim 4 wherein said interrupt coprocessor is configured to request an interrupt vector from said interrupt controller.

6. The computer system as recited in claim 5 wherein said interrupt vector is indicative of said one of said plurality of interrupt request signals.

7. The computer system as recited in claim 5 wherein said interrupt coprocessor requests said interrupt vector from said interrupt controller via an interrupt acknowledge bus transaction.

8. The computer system as recited in claim 1 wherein said interrupt coprocessor further comprises a bus interface unit configured to perform bus transactions.

9. The computer system as recited in claim 8 wherein said bus transactions comprises interrupt acknowledge bus transactions.

10. The computer system as recited in claim 8 wherein said interrupt coprocessor further comprises:
    an instruction storage configured to store interrupt service routines, wherein said instruction storage receives said interrupt service routines from said bus interface unit; and
    an execution unit coupled to receive instructions comprising said interrupt service routines from said instruction storage.

11. The computer system as recited in claim 10 wherein said execution unit is configured to execute an interrupt instruction, and wherein said interrupt coprocessor is configured to interrupt said microprocessor during a second clock cycle in which said interrupt instruction is executed.

12. The computer system as recited in claim 10 wherein said interrupt coprocessor is configured to receive said interrupt service routines from said microprocessor.

13. The computer system as recited in claim 1 wherein said interrupt coprocessor comprises a data pump.

14. The computer system as recited in claim 1 wherein said interrupt coprocessor and said interrupt controller are integrated within a common integrated circuit chip.

15. A computer system, comprising:
    a microprocessor configured to execute a task comprising a plurality of instructions, and wherein said microprocessor includes an interrupt conductor, and wherein said microprocessor is configured to interrupt said task according to a signal upon said interrupt conductor;
    an interrupt controller configured to receive a plurality of interrupt request signals and to convey an interrupt signal upon receipt of one of said plurality of interrupt request signals; and
    a dedicated interrupt coprocessor coupled between said interrupt controller and said microprocessor, wherein said interrupt coprocessor is configured to execute interrupt service routines in response to said interrupt signal from said interrupt controller, and wherein said interrupt coprocessor comprises a second microprocessor configured primarily to execute interrupt service routines, and wherein said interrupt coprocessor is coupled to said interrupt conductor, and wherein said interrupt coprocessor is configured to convey said signal upon said interrupt conductor if said interrupt coprocessor determines that said microprocessor is configured to execute said interrupt service routine.

16. The computer system as recited in claim 15 further comprising a main memory coupled to said microprocessor, wherein said main memory is configured to store tasks and interrupt service routines.

17. The computer system as recited in claim 15 further comprising a plurality of input/output devices coupled to said interrupt controller, wherein each of said input/output devices is configured to convey one of said plurality of interrupt request signals.

18. The computer system as recited in claim 15 wherein said interrupt coprocessor is configured to select one of a plurality of interrupt service routines for execution according to said one of said plurality of interrupt request signals.

19. The computer system as recited in claim 18 wherein said interrupt coprocessor is configured to request an interrupt vector from said interrupt controller.

20. The computer system as recited in claim 19 wherein said interrupt vector is indicative of said one of said plurality of interrupt request signals.

21. The computer system as recited in claim 19 wherein said interrupt coprocessor requests said interrupt vector from said interrupt controller via an interrupt acknowledge bus transaction.

22. The computer system as recited in claim 15 wherein said interrupt coprocessor further comprises a bus interface unit configured to perform bus transactions.

23. The computer system as recited in claim 22 wherein said bus transactions comprises interrupt acknowledge bus transactions.

24. The computer system as recited in claim 22 wherein said interrupt coprocessor further comprises:

an instruction storage configured to store interrupt service routines, wherein said instruction storage receives said interrupt service routines from said bus interface unit; and an execution unit coupled to receive instructions comprising said interrupt service routines from said instruction storage.

25. The computer system as recited in claim 24 wherein said execution unit is configured to execute an interrupt instruction, and wherein said interrupt coprocessor is configured to interrupt said microprocessor during a second clock cycle in which said interrupt instruction is executed.

26. The computer system as recited in claim 24 wherein said interrupt coprocessor is configured to receive said interrupt service routines from said microprocessor.

27. The computer system as recited in claim 15 wherein said interrupt coprocessor and said interrupt controller are integrated into an integrated circuit.

* * * * *